United States Patent [19]

Cornell

[11] 4,239,053

[45] Dec. 16, 1980

[54] FUEL FLOW DISTRIBUTION SYSTEM

[75] Inventor: Richard H. Cornell, Marblehead, Mass.

[73] Assignee: The United States of America as represented by the Secretary of the Air Force, Washington, D.C.

[21] Appl. No.: 10,091

[22] Filed: Feb. 7, 1979

[51] Int. Cl.³ .......................................... G05D 11/03
[52] U.S. Cl. ............................... 137/110; 60/39.28 R
[58] Field of Search ............... 137/110, 118, 504, 114; 60/39.28 R

[56] References Cited

U.S. PATENT DOCUMENTS

| | | | |
|---|---|---|---|
| 2,707,021 | 4/1955 | Harris | 137/110 |
| 2,724,239 | 11/1955 | Fox | 60/39.28 R |
| 2,926,494 | 3/1960 | Farkas | 60/39.28 R |
| 2,966,210 | 12/1960 | Nordwald | 60/39.28 R |
| 2,988,875 | 6/1961 | Farkas | 60/39.28 R |
| 3,496,962 | 2/1970 | Tuzson | 137/504 |
| 3,856,486 | 12/1974 | Chang | 137/110 |
| 3,857,241 | 12/1974 | Lewis | 60/39.28 R |
| 3,915,188 | 10/1975 | Burnell et al. | 60/39.28 R |
| 4,036,246 | 7/1977 | Cornell | 137/118 |

Primary Examiner—William R. Cline
Assistant Examiner—H. Jay Spiegel
Attorney, Agent, or Firm—Donald J. Singer; Jacob N. Erlich

[57] ABSTRACT

A fuel flow distribution system having a hydraulically actuated flow sensing valve, a hydraulically operated switch assembly and at least one hydraulically operated on-off valve assembly. These elements are operably connected to a metered flow manifold and a plurality of distributor lines. The flow sensing valve supplies fuel to the manifold. Various flow rates of the fuel within the distributor lines causes the flow sensing valve to emit a signal. Upon receipt of this signal the switch assembly transmits the signal to the valves making up each valve assembly. The on-off valve assembly (assemblies) alters the flow restriction at the distributor lines in such a manner as to limit the change of pressure therein.

8 Claims, 3 Drawing Figures

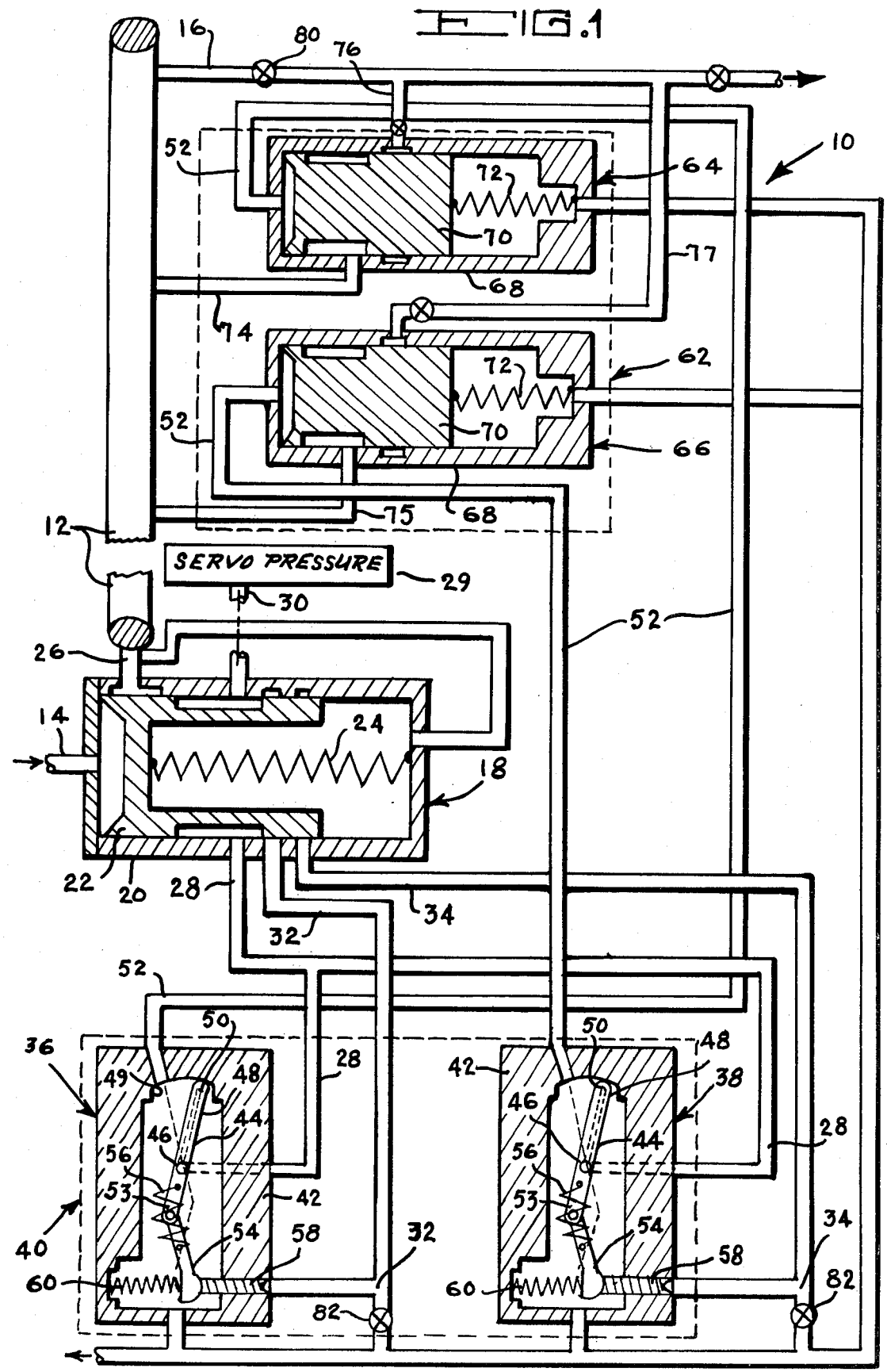

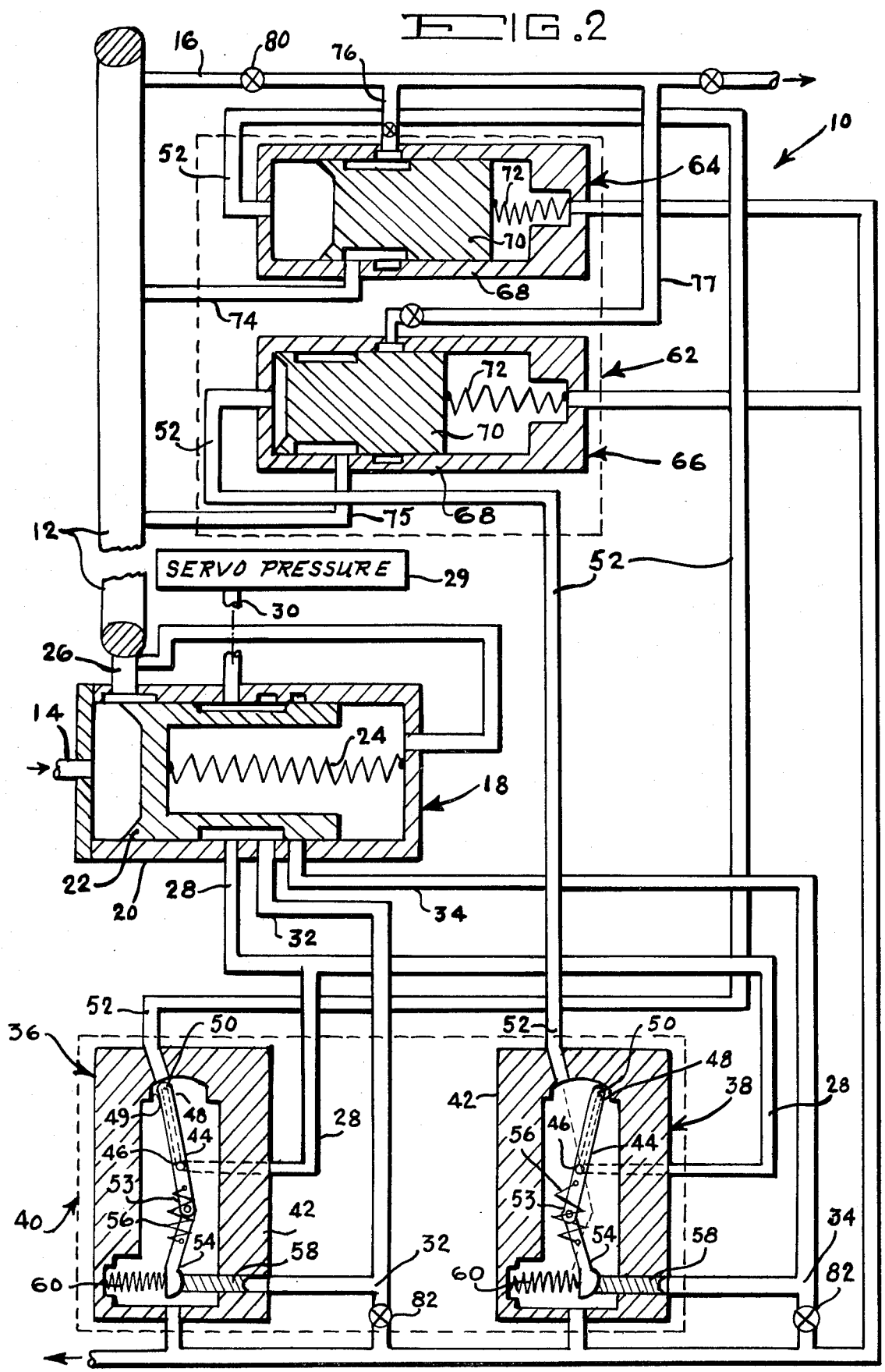

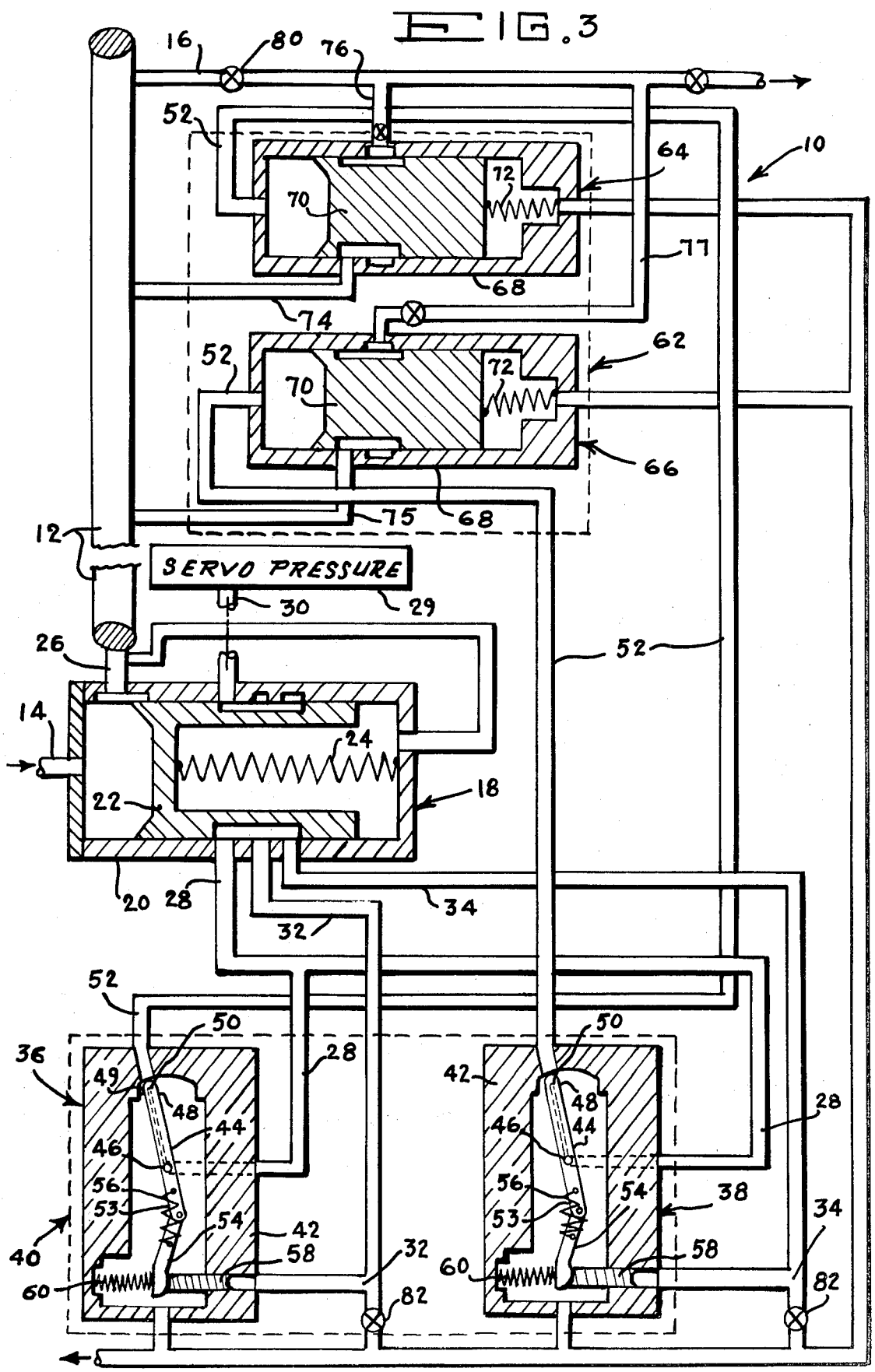

FUEL FLOW DISTRIBUTION SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to fuel supply and distribution systems, and, more particularly, to a hydraulic fuel flow distribution system for a gas turbine engine that can operate accurately in contaminated or gumming fuel situations.

In a gas turbine engine, fuel is generally supplied to a combustor or afterburner by a plurality of fuel injectors which receive a regulated flow of fuel from an interconnecting manifold. Between the manifold and each fuel injector, there is generally provided a plurality of relief valves having the same flow versus pressure drop characteristics. These relief valves are supplied fuel by the common manifold and supply fuel to flow tubes (vaporizing system), spray nozzles (atomizing systems), or spray bars (afterburners). A typical system may have twenty or more relief valves arranged in parallel. Each relief valve has a precise metering window which cooperates with a spring actuated metering piston to accurately schedule fuel flow for a particular pressure drop.

These valves are highly dirt sensitive in that they have pistons with sliding diametral fits of 0.0005 inches or less which cannot be protected by a reasonably sized filter. Consequently, relief valve, nozzle or spray bar replacement is a common field complaint because the internal valve is sticky. In addition, recent military specifications state that all fuel system components must pass the "qualification engine components test" which includes a contaminated fuel test. In the past, nozzles and spray bars have not been subjected to this test because they were considered part of the combustor or afterburner and not part of the fuel system.

U.S. Pat. No. 4,036,246 entitled "Fuel Supply and Distribution" by the inventor of the instant application sets forth a mechanical fuel and distribution system which overcomes many of the problems encountered in the past. However, this mechanical system still relies heavily, for proper operation, on many moving parts within the system. It therefore would be beneficial to provide a less complex hydraulic system capable of providing a fuel supply to a gas turbine engine or the like.

SUMMARY OF THE INVENTION

The instant invention overcomes the problems encountered in the past and as set forth hereinabove by providing a hydraulic fuel flow distribution system that can operate accurately in contaminated or gumming fuel.

The hydraulic fuel flow distribution system of this invention is made up of three major components, a flow sensing valve, a switch assembly and at least one on-off valve assembly containing a valve for each switch in the switch assembly. In addition, the invention incorporates therein a metered flow manifold, two switching manifolds, a boost pressure manifold and a plurality of distributor lines. These elements are combined in such a manner as to provide reliable fuel flow distribution even when utilized with contaminated or gumming fuel. As with U.S. Pat. No. 4,036,246, the instant invention can be readily incorporated within a conventional gas turbine engine.

The flow sensing valve of the distribution system of this invention is operatively connected to the afterburner fuel control so as to receive a minimum rate of metered flow. The flow sensing valve positions itself in accordance with the flow rate. The metered flow passes through the flow sensing valve into the metered flow manifold and from the manifold into a plurality of distributor lines which are in turn operatively connected to a plurality of spray bars for subsequent passage of the fuel into the afterburner combustor. As the flow rate increases, the pressure drop across the orifice in the distributor lines increase. When the pressure drop reaches the maximum allowable by the system design, the flow sensing valve moves in accordance with the flow rate so as to allow servo pressure to be ported into the switch assembly.

Located within the switch assembly are a pair of jet pipe switches. As the maximum pressure drop at the orifices is reached one of the jet pipe switches directs the pressure from the servo pressure system into the switching manifold. This pressure switches the valve in each of the valve assemblies associated with that particular jet pipe switch from off to on so metered flow is divided. The metered flow manifold pressure drops to its minimum pressure level when the on-off valve is on.

As the metered flow continues to increase, the maximum allowable manifold pressure is again reached and the flow sensing valve positions to pressurize the other jet pipe switch which in turn switches the valve in each of the valve assemblies associated with that switch on, thereby maintaining normal operation. Subsequent lowering of the flow rate results in the flow sensing valve positioning to turn the on-off valves off. Consequently, a continuous flow distribution is achieved by the instant invention during a variety of flow rates within preselected pressure limits.

It is therefore an object of this invention to provide a hydraulic fuel distribution system which incorporates a single metered flow manifold system with stage switching manifolds.

It is another object of this invention to provide a hydraulic fuel distribution system in which the switching is on-off in nature to aid reliability.

It is still another object of this invention to provide a hydraulic fuel distribution system in which the switching manifolds and boost manifolds are for control use only and therefore may be of small tube size.

It is a further object of this invention to provide a hydraulic fuel flow distribution system in which stages may be added or subtracted as needed for other flow turn down and pressure drop requirements.

It is still a further object of this invention to provide a hydraulic fuel flow distribution system in which the flow sensing valve and jet pipe switches can be designed large enough to have good force margins.

It is still another object of this invention to provide a hydraulic fuel flow distribution system which improves the overall efficiency and life of combustor as well as engine components.

It is still another object of this invention to provide a hydraulic fuel flow distribution system which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE DRAWING

FIG. 1 is a schematic representation of the hydraulic fuel flow distribution system of this invention shown partly in cross section;

FIG. 2 is a schematic illustration of the hydraulic fuel flow distribution system of this invention shown partly in cross section and in a mode of operation in which one of the jet pipe switches and one of the on-off valves are in the on position; and FIG. 3 is a schematic illustration of the hydraulic fuel flow distribution system of this invention shown partly in cross section and in which both the jet pipe switches and on-off valves are in the on position.

DETAILED DESCRIPTION OF THE PREFERRED EMBODIMENT

Reference is now made to FIG. 1 of the drawing which shows in schematic fashion the hydraulic fuel flow distribution system 10 of the instant invention which is utilized in conjunction with a conventional metered flow manifold tube 12 of, for example, a gas turbine engine (not shown). Manifold 12 receives a metered flow of fuel from a conventional afterburner fuel control (not shown) which is operatively connected by conduit 14 to fuel flow distribution system 10 in a manner to be described in detail hereinbelow. The fuel control receives a flow of pressurized fuel from any suitable source of fuel (also not shown).

Manifold 12 branches into a plurality of circumferentially spaced apart fuel distributor lines 16 (only one of which is shown in the drawing). Distributor lines 16 furnish fuel to a burner or burners or the equivalent (not shown) as may be found in a gas turbine engine of the kind having a compressor which supplies air to a combustion system in which liquid fuel is burned. The resultant energized gaseous mixture drives a gas turbine of which a part of the whole shaft power output is used to drive the compressor while a residual energy of the exhaust gases is utilized to produce propulsive thrust or drive a free turbine supplying shaft power or the like. The fuel distributor lines 16 are mounted around the burner which may be either a main combustor or an afterburner and may be either of the flow tube type as is utilized in conventional vaporizing combustion systems, or the spray nozzle type as is utilized in conventional atomizing combustion systems; or the spray bar type as is utilized in conventional afterburning combustion systems.

Still referring to FIG. 1 of the drawing, a flow sensing valve 18 is operably interconnected between the fuel control conduit 14 and metered flow manifold 12 so as to supply metered fuel to manifold 12 which in turn distributes the fuel through the distributor lines 16. Flow sensing valve 18 is formed of an elongated, hollow housing 20 having a piston 22 slidably mounted therein. Any suitable biasing means such as spring 24 is interposed between the rear wall of housing 20 and piston 22 to bias portion 22 to the left as shown in the drawing thereby blocking off a port 26 operably connecting valve 18 to manifold 12.

In addition to the above elements, housing 20 has a plurality of lines 28, 32 and 34 operably connected thereto and extending therefrom. Servo pressure line 28 receives, in a manner to be described in detail hereinbelow, a source of fluid from any suitable servo pressure source 29 by way of servo pressure inlet line 30. In addition, servo pressure is also received by lines 32 and 34 in order to operate a pair of jet pipe switches 36 and 38 which form switch assembly 40.

As stated hereinabove, switch assembly 40 is made up of a pair of conventional jet pipe switches 36 and 38. Jet pipe switches 36 and 38 are interconnected by way of lines 28, 32 and 34 to flow sensing valve 18. Since each jet pipe switch 36 and 38, respectively, is identical in its construction, the following detailed description will be given with respect to only one such switch 36 with the other switch 38 utilizing the same numerals for identical elements. In addition, any number of jet pipe switches may be utilized in jet pipe switch assembly 40 within the concept of this invention.

Jet pipe switch 36 is formed of a hollow, elongated housing 42 having situated in the interior portion thereof a tubular member 44. Tubular member 44 is pivotally attached at 46 to housing 42 and interconnected by means of its pivotal attachment or connection 46 to line 28. One end 48 of tube 44 has an opening 50 therein operable to interact (in a manner to be described in detail hereinabove) with a switching manifold 52. The other end 53 of tubular member 44 is pivotally connected to an arm 54 which is arranged in an off-center relationship. This relationship of elements 44 and 54 in conjunction with spring 56 enables tubular member 44 to move between the position shown in FIG. 1 of the drawing and the positions shown in FIGS. 2 and 3 of the drawing. The movement of jet switch 36 takes place as the result of the actuation thereof by a piston 58 operably connected to manifold 32 (or 34 with respect to switch 38). Maintaining arm 54 against piston 58 is any suitable biasing means such as spring 60.

Reference is now made to the on-off valve assembly 62 which incorporates therein a pair of on-off valves 64 and 66, respectively. Since valves 64 and 66 are identical in construction, the detailed description of their make-up will be given only with respect to valve 64 with identical elements thereof being represented by the same numeral in valve 66. It should be realized, however, that for optimum performance of the instant invention a plurality of valve assemblies 62 are utilized with jet pipe switch assembly 40. Furthermore, each valve assembly 62 may contain more than two valves therein. Each valve within each respective valve assembly 62 is operably connected to its corresponding jet pipe switch within jet pipe switch assembly 40. For example, if three valves are utilized in each valve assembly 62 there should be three corresponding jet pipe switches in switch assembly 40 with each jet pipe switch simultaneously operating its corresponding valves in each valve assembly 62. For simplicity, only two valves 64 and 66 and their associated two jet pipe switches 36 and 38, respectively, are described in the specification and shown in the drawing.

Valve 64 is made up of a hollow housing 68 having a slidable piston 70 mounted therein. Piston 70 is normally maintained in the left or the off position by any suitable biasing means such as spring 72 (as shown in FIG. 1). In addition, manifolds 52 interconnect jet pipe switches 36 and 38 to on-off valves 64 and 66, respectively. These manifolds 52 allow servo pressure to be applied to one side of valve 64 (66) and against piston 70. Fuel for distribution is received by valves 64 and 66 by means of inlet conduits 74 and 75, respectively. In the on position (shown in FIGS. 2 and 3) this fuel is distributed by way of conduits 76 and 77, respectively, to distribution line 16.

Again as stated above, although only one valve assembly 62 is shown in the drawing, a plurality of these assemblies are generally utilized with the instant invention. Each assembly 62 is operably connected to a respective distributor line 16 (only one of which being shown in the drawing).

In operation, a minimum rate of metered fuel flow is supplied from the afterburner fuel control (not shown) by way of conduit 14 to flow sensing valve 18 of the fuel flow distribution system 10 of this invention. The metered flow through port 26 of flow sensing valve 18 causes a pressure drop to take place. The flow sensing valve 18 opens until the force generated by the pressure drop times the area of piston 22 equals the valve spring force of spring 24. Consequently, flow sensing valve 18 thus positions itself as a function of flow rate.

The metered flow passes through port 26 to manifold 12 and thereafter into a plurality of distributor lines 16 (only one shown in the drawing). A minimum back pressure is also generated so the manifold fuel does not contain excessive vapor. The flow from distributor line 16 then goes through a plurality of spray bars (not shown) into the afterburner combustor (not shown).

As the flow rate increases, the pressure drop across the orifices 80 of lines 16 (only one shown in drawing) increase. When the pressure drop reaches the maximum allowable by the design of the system of the instant invention, flow sensing piston 22 moves to the right by a small amount as shown in FIG. 2 of the drawing. Consequently, the servo pressure entering conduit 30 is ported by way of line 32 (as shown in FIG. 2 of the drawing) to jet pipe switch 36. Excess servo flow leaves through orifice 82 in line 32 to boost pressure. As the maximum pressure drop at orifice 82 is reached, the servo pressure has loaded piston 58 so spring 56 goes over-center causing jet pipe switch 36 to switch against a stop 49 in the position shown in FIG. 2 of the drawing.

Tubular member 44 of jet pipe switch 36 is supplied servo pressure through its pivot 46 from line 28. It thereby directs this pressure into switching manifold 52. This pressure switches all valves of each assembly 62 connected to switch 36 represented in the drawing by on-off valve 64 from its off position shown in FIG. 1 of the drawing to its on position shown in FIG. 2 of the drawing.

As metered flow continues to increase, maximum allowable manifold pressure is again reached. Consequently, flow sensing valve piston 22 moves further to the right as shown in FIG. 3 of the drawing so as to pass servo pressure through line 34 onto jet pipe switch 38 in the same manner as set forth hereinabove with respect to jet pipe switch 36. Subsequent servo pressure by way of manifold 52 switches all other valves connected to switch 38 and represented by on-off valve 66 from its off position shown in FIG. 1 of the drawing to its on position shown in FIG. 3 of the drawing.

Such operation allows for reliable fuel flow distribution through distribution line 16 by way of on-off valve assembly 62 through exit conduits 76 and 77. It should be realized that although operation of this invention is shown with respect to only one on-off valve assembly 62 and line 16, this invention is operable with a plurality of such on-off valve assemblies 62 and distribution lines 16. Furthermore, it should be realized that each assembly 62 is not limited to merely two valves as long as the number of jet pipe switches and on-off valves correspond.

Although this invention has been described with reference to a particular embodiment, it will be understood to those skilled in the art that this invention is also capable of further and other embodiments within the spirit and scope of the appended claims.

I claim:

1. A fluid flow distribution system comprising means for supplying a flow of metered fluid, means operably connected to said metered fluid supplying means for receiving and dispersing said flow of metered fluid, at least one distributor line operably connected to said fluid receiving and dispersing means for receiving said flow of metered fluid from said fluid receiving and dispersing means and dispensing said flow of metered fluid at a predetermined pressure, said metered fluid supplying means including a valve, said valve providing a signal in accordance with a change in flow through said distributor line, at least one switching means operably connected to said valve for receiving said signal therefrom and transmitting said signal, at least one on-off valve normally in the off position operably connected to said switching means for receiving said transmitted signal therefrom, said signal from said switching means actuating said on-off valve to the on position, means interconnecting said on-off valve to said fluid receiving and dispersing means and to said distributor line for providing an additional path for said flow of metered fluid to flow from said fluid receiving and dispersing means to said distributor line upon said actuation of said on-off valve to said on position.

2. A fluid flow distribution system as defined in claim 1 wherein said valve of said metered fluid supply means, said switching means and said on-off valve are all hydraulically actuated.

3. A fluid flow distribution system as defined in claim 2 wherein said hydraulically actuated valve of said metered fluid supplying means comprises a housing, a piston, said piston being slidably mounted within said housing, said piston movement within said housing taking place in accordance with said change in fluid flow within said distributor line and means in operable relationship with said piston and said housing for supplying a servo pressure to said valve, said servo pressure providing a source for said signal whereby the position of said piston within said housing determines the condition of said signal being emitted from said valve of said metered fluid supplying means to said switching means.

4. A fluid flow distribution system as defined in claim 3 wherein said hydraulically operated switching means comprises a housing, means located within said housing for transmitting said signal from said hydraulically actuated valve to said on-off valve and means for actuating said transmitting means in accordance with said signal.

5. A fluid flow distribution system as defined in claim 4 wherein said hydraulically operated on-off valve comprises a housing, a piston, said piston being slidably mounted within said piston, said piston movement within said housing taking place in accordance with said signal from said hydraulically operated switching means and means associated with said piston and said housing for altering the resistance to flow of said fuel from said fluid receiving and dispersing means to said distributor line in accordance with said signal from said hydraulically actuated switching means.

6. A fluid flow distribution system as defined in claim 5 further comprising a plurality of said hydraulically operated on-off valves and said switching means being operably connected to each of said plurality of on-off valves.

7. A fluid flow distribution system as defined in claim 2 wherein said hydraulically operated switching means comprises a housing, means located within said housing for transmitting said signal from said hydraulically actuated valve to said on-off valve and means for actuating said transmitting means in accordance with said signal.

8. A fluid flow distribution system as defined in claim 2 wherein said hydraulically operated on-off valve comprising a housing, a piston, said piston being slidably mounted within said housing, said piston movement within said housing taking place in accordance with said signal from said switching means and means associated with said piston and said housing for altering the resistance to flow of said fuel from said fluid receiving and dispersing means to said distributor line in accordance with said signal from said hydraulically actuated valve.

* * * * *